(12) United States Patent
Tsunoda et al.

(10) Patent No.: US 6,300,396 B1
(45) Date of Patent: *Oct. 9, 2001

(54) RUBBER COMPOSITION FOR THE GUIDE LUG OF RUBBER TRACK

(75) Inventors: Katsuhiko Tsunoda, Yokohama; Shingo Kato, Tokyo; Naoki Nishimura, Yokohama, all of (JP)

(73) Assignee: Bridgestone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/092,864

(22) Filed: Jun. 8, 1998

(30) Foreign Application Priority Data

Dec. 19, 1995 (JP) .................................................. 7-330919

(51) Int. Cl.$^7$ ........................................................ C08J 5/20
(52) U.S. Cl. .............................. 524/232; 525/240; 305/38
(58) Field of Search ........................... 524/232; 525/240; 305/38

(56) References Cited

U.S. PATENT DOCUMENTS

| | | | |
|---|---|---|---|
| 4,500,666 | * 2/1985 | Wada | 524/232 |
| 4,775,711 | * 10/1988 | Kawamura et al. | 524/232 |
| 5,246,994 | * 9/1993 | Shibahara et al. | 524/232 |
| 5,314,752 | * 5/1994 | Bova et al. | 428/424.4 |
| 5,314,912 | * 5/1994 | Yoshitani et al. | 524/458 |
| 5,447,365 | * 9/1995 | Muramatsu et al. | 305/38 |

FOREIGN PATENT DOCUMENTS

A-6-72362    3/1994   (JP) .

* cited by examiner

Primary Examiner—Peter D. Mulcahy
(74) Attorney, Agent, or Firm—Oliff & Berridge, PLC

(57) ABSTRACT

Disclosed is a guide lug composition for a rubber track comprising 5 to 40 parts by weight of a fatty acid amide based on 100 parts by weight of a raw rubber material; or comprising 5 to 40 parts by weight of a Ultra High Molecular Weight Polyethylene (UHMW-PE) powder based on 100 parts by weight of a raw rubber material; or comprising 5 to 40 parts by weight of a fatty acid amide and 5 to 40 parts by weight of a UHMW-PE power based on 100 parts by weight of a raw rubber material. The guide lug composition serves to reduce abrasion of or damages to a guide lug, to improve the characteristics in preventing the rubber track from slipping off a wheel, which is called "detracking", to reduce friction loss when the guide lug contacts and collides with the wheel thereby reducing energy losses.

20 Claims, 3 Drawing Sheets

RUBBER COMPOSITION FOR THE GUIDE LUG OF RUBBER TRACK

BACKGROUND OF THE INVENTION

1. Field of the Invention

The present invention relates to a rubber track, and, particularly, to a rubber composition for a guide lug material projecting from the inner surface of a rubber track.

2. Description of the Related Art

A rubber track is generally provided with a plurality of guide lugs formed at spaced intervals in the longitudinal direction of the inner surface thereof. In this positive drive type of rubber track, the guide lugs have functions of transferring the driving force from a sprocket and/or preventing the rubber track from slipping off a wheel, which is called "detracking".

It is considered that detracking occurs as follows: The rubber track is hit by a lateral force which produces a relative shift between the rubber track and the wheel. In this case, the guide lug repeatedly contacts and collides with the wheel, while the shifted guide lug is forced to return to its previous, regular position, resulting in abrasion of or damage to the guide lug. There is also a possibility of the detracking.

FIG. 1 shows a rubber track 1, from the inner surface of which a row of guide lugs 3 project. A wheel 5 normally rotates so that it strides over the guide lug 3. When a relative shift between the rubber track 1 and the wheel 5 is produced, the wheel 5, as shown by the dotted line in the figure (only one of the wheels 5 is shown), repeatedly contacts and collides with the guide lug 3 whereby the shift between both is limited and the shifted rubber track 1 is forced to return to its previous, regular rolling contact surface. The abrasion of or damage to both sides of the guide lug 3 is therefore significant.

Furthermore, when the guide lug is engaged with a sprocket, not shown, to convey driving force, a guide lug is always rubbed against a sprocket pin. The guide lug is deformed by the force applied especially to the root, which creates abrasion or damage easily. In addition, the contact and collision between the wheel 5 and the guide lug cause a large running resistance resulting in large energy losses.

In order to solve the aforementioned problem, for instance, Japanese Patent Application Laid-Open (JP-A) No. 6-72362 discloses a structure in which a guide lug projecting from the inner surface of a rubber track is formed with a low friction material exposed to the contact face with the other material. FIG. 3 shows a plate-like low friction material (Ultra High Molecular weight Polyethylene: UHMW-PE) 6 embedded inwardly into the guide lug 3 projecting from the inner surface of the rubber track. As shown in FIG. 3, the low friction material 6 is exposed from both sides $3_3$ and the top $3_2$ of the guide lug 3 so that it contacts and collides with the wheel 5 and with an idler and a sprocket which are not shown. The friction between the low friction material 6 and these materials is low due to the low friction characteristics of the low friction material 6. This reduces the occurrence of the detracking and the abrasion or damege of guide lugs. And the low running resistance and low energy losses can be obtained due to the good self-lublicating characteristics of this material.

Such a structure using the low friction material 6 poses the following problem: When a relative shift between the guide lug 3 and the wheel 5 is produced, excess force is applied to the guide lug 3. Consequently, the side $3_3$ of the guide lug 3 contacts and collides with the wheel 5. At this time, a concentrated stress which is imposed on the boundary between a rubber member of the guide lug 3 and the low friction material 6, though it depends upon the difference in hardness between them, causes breakdown of the boundary. This structure also requires stable adhesion of the low friction material 6 to the rubber member of the guide lug 3.

SUMMARY OF THE INVENTION

Objects of the present invention are to reduce abrasion of or damage to a guide lug which projects from the inner surface of a rubber track, to improve the characteristics in preventing the rubber track from detracking, to reduce the friction loss which occurs when the guide lug contacts and collides with the wheel thereby reducing energy loss, vibration and noise. The object of the present invention can be attained by the provision of a rubber track using a specific composition for the guide lug which projects from the inner surface of the rubber track.

According to a first aspect of the present invention, there is provided a guide lug composition for a rubber track comprising 5 to 40 parts by weight preferably 5 to 20 parts by weight, more preferably 5 to 10 parts by weight of a fatty acid amide based on 100 parts by weight of a raw rubber material. According to a further aspect of the present invention, there is provided a guide lug composition for rubber track comprising 5 to 40 parts by weight preferably 5 to 30 parts by weight, more preferably 5 to 20 parts by weight of UHMW-PE powder based on 100 parts by weight of a raw rubber material. According to another aspect of the present invention, there is provided a guide lug composition for a rubber track comprising 5 to 40 parts by weight preferably 5 to 20 parts by weight, more preferably 5 to 10 parts by weight of a fatty acid amide and 5 to 40 parts by weight preferably 5 to 30 parts by weight, more preferably 5 to 20 parts by weight of a UHMW-PE powder based on 100 parts by weight of a raw rubber material.

DESCRIPTION OF PREFERRED EMBODIMENTS

Figure 1:
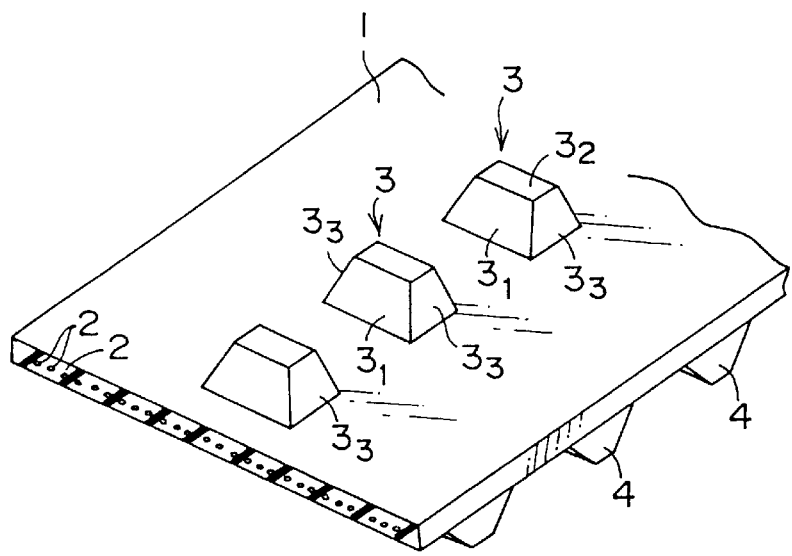
FIG. 1 is a view showing an embodiment of a positive drive type rubber track.
Figure 2:
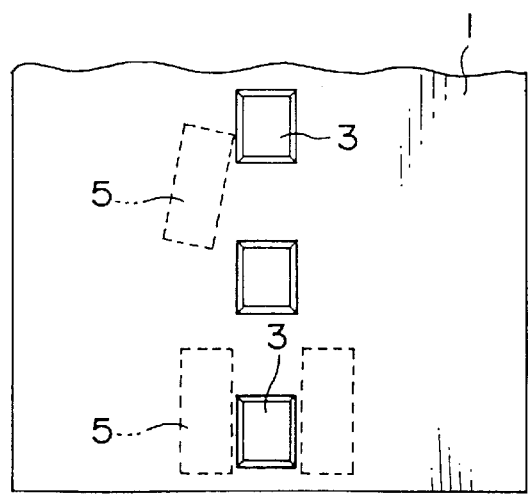
FIG. 2 is a view showing the inner surface of the positive drive type rubber track.
Figure 3:
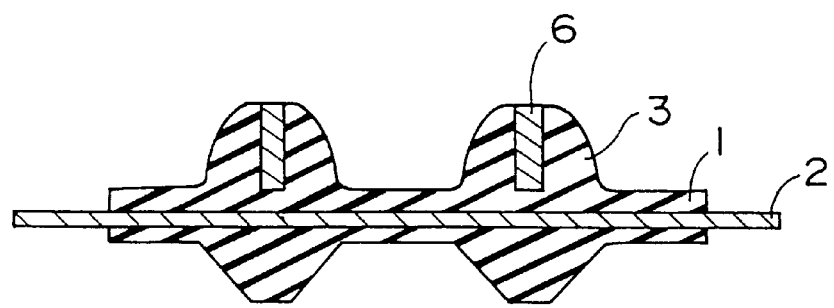
FIG. 3 is a cross-sectional view of a longitudinal direction of a rubber track guide lug portion.

In an embodiment of the present invention, a fatty acid amide and/or a UHMW-PE powder are used in the guide lug for a rubber track, whereby the coefficient of friction coefficient ($\mu$) of the guide lug can be reduced to about one-half to one-fourth that of conventional rubber. Also, problems such as abrasion resistance of the projecting side, detracking and running energy losses can be solved. There is also no need for measures against conventional problems such as the breakdown of the boundary between the rubber and the low friction material and unstable adhesion.

The raw rubber material used in the rubber composition of the present invention may be selected from natural rubbers and synthetic rubbers. Synthetic rubber may be isoprene rubber, styrene-butadiene rubber, acrylonitrile-butadiene rubber, ethylene-propylene rubber, butadiene rubber, butyl rubber, 1,2-polybutadiene, nitrile rubber, and terminal modifications of these compounds. These raw rubber materials may be used either independently or in combinations of two or more.

Examples of the fatty acid amide used for the rubber composition of the present invention may include hydroxystearamide, erucylamide, ethylenebisstearamide, ethylenebislaurylamide, stearamide, oleylamide, laurylamide, palmitylamide, methylenebisstearamide, ethylenebisoleylamide, and stearyloleylamide. Among these, amides of higher fatty acid are preferred.

The amount of the fatty acid amide may be preferably 5 to 40 parts by weight, more preferably 5 to 20 parts by weight, most preferably 5 to 10 parts by weight based on 100 parts by weight of the raw rubber material.

As the UHMW-PE powder used for the rubber composition of the present invention, those having an average molecular weight of 1,000,000 or more and an average particle diameter of 10 to 50μm (for example, Mipelon manufactured by Mitsui Petrochemical Industries, Ltd.) are preferable. The amount of the UHMW-PE powder may be 5 to 40 parts by weight, preferably 5 to 30 parts by weight more preferably 5 to 20 parts by weight.

In the rubber composition of the present invention, conventional additives used for rubber may be formulated. Examples of such an additive may include carbon black, processing oil, aging-preventives, vulcanizing agents, vulcanization accelerators and processing adjuvants. Also, various resins (for example, a phenol resin) may be mixed or added as required. Various short staples may be further formulated.

EXAMPLES

The present invention will be illustrated by way of the following examples, but is not limited to them.

Examples 1–3 and Comparative Example 1

Oleylamide was added at each amount described in Table 1 to the base rubber composition for Comparative Example 1 to produce guide lug compositions of Examples 1 to 3 for a rubber track. These rubber compositions of the examples and comparative example were vulcanized and these vulcanized rubber compositions were evaluated in various tests. Test results are also shown in Table 1.

TABLE 1

|  | Example 1 | Example 2 | Example 3 | Comparative Example 1 |
|---|---|---|---|---|
| (Formulation) | | | | |
| NR | 70 | — | — | — |
| SBR | 30 | — | — | — |
| Oleylamide | 5 | 10 | 15 | 0 |
| Carbon (HAF) | 60 | — | — | — |
| Stearic acid | 2 | — | — | — |
| Zinc oxide | 5 | — | — | — |
| Aroma oil | 5 | — | — | — |
| Aging preventive | 2 | — | — | — |
| Resin | 5 | — | — | — |
| Sulfur | 2 | — | — | — |
| Vulcanization accelerator | 1 | — | — | — |

TABLE 1-continued

|  | Example 1 | Example 2 | Example 3 | Comparative Example 1 |
|---|---|---|---|---|
| (Test evaluation) | | | | |
| Hd (JIS-A) | 84 | 83 | 81 | 84 |
| Ts (kgf/cm$^2$) | 195 | 187 | 175 | 200 |
| Eb (%) | 520 | 590 | 600 | 410 |
| Coefficient of static friction ($\mu$s) | 0.75 | 0.65 | 0.60 | 2.49 |
| Coefficient of dynamic friction ($\mu$d) | 0.61 | 0.59 | 0.53 | 2.30 |
| Abrasion loss of the side of the guide lug % | 4.6 | 3.1 | 3.1 | 12.3 |
| Driving torque (kgf × m) | 18.5 | 17.5 | 17.5 | 20.0 |

"—" in Table 1 means the same amount as that on the left column.

Each of the compositions was evaluated in each test described in Table 1 according to the following methods.

(1) Hd (hardness), Ts (tensile strength), and Eb (elongation): Evaluated According to JIS-K6301.

(2) Measurement of Friction Coefficient

Maximum coefficient of static friction ($\mu$s) and coefficient of dynamic friction ($\mu$d): evaluated by measuring the friction coefficients of the surfaces of the rubber sample and an aluminum plate under a load of 750 g using a surface measuring machine manufactured by Shin Tou Kagaku Co., Ltd.

(3) Endurance Test

Rubber tracks (width: 300 mm, circumferential length: 2.4 m) formed with a rubber guide lug 3 composed of rubber compositions prepared in Examples 1 to 3 and Comparative Example 1 were produced. Each of the rubber tracks was attached to a bending test machine shown in FIG. 6 and was subjected to a bending test 2,000,000 times under the following conditions: tensile force: 2 tons, rotating speed of sprocket 7: 50 rpm, and braking torque of idler 9: 0 kgf×m, to measure the driving torque at the time of bending and the abrasion loss of the side 3$_3$ of the guide lug after completion of the bending test 2,000,000 times.

Figure 4:
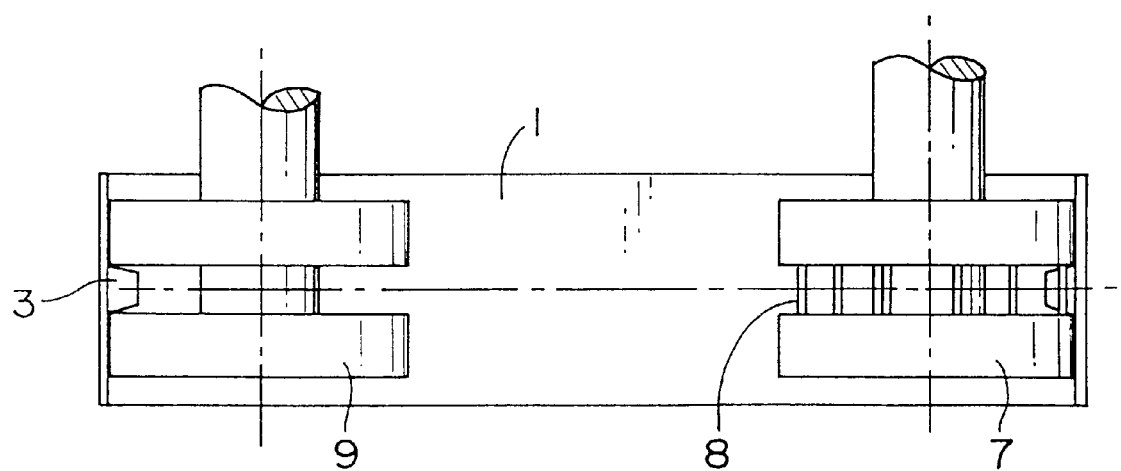
FIG. 4 is a typical top plan view of a conventional bending test machine.
Figure 5:
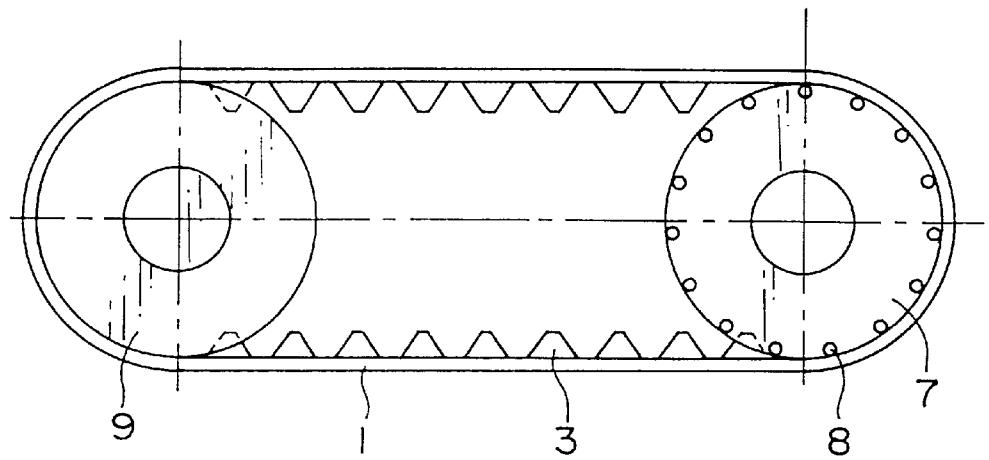
FIG. 5 is a typical side view of a conventional bending test machine.
Figure 6:
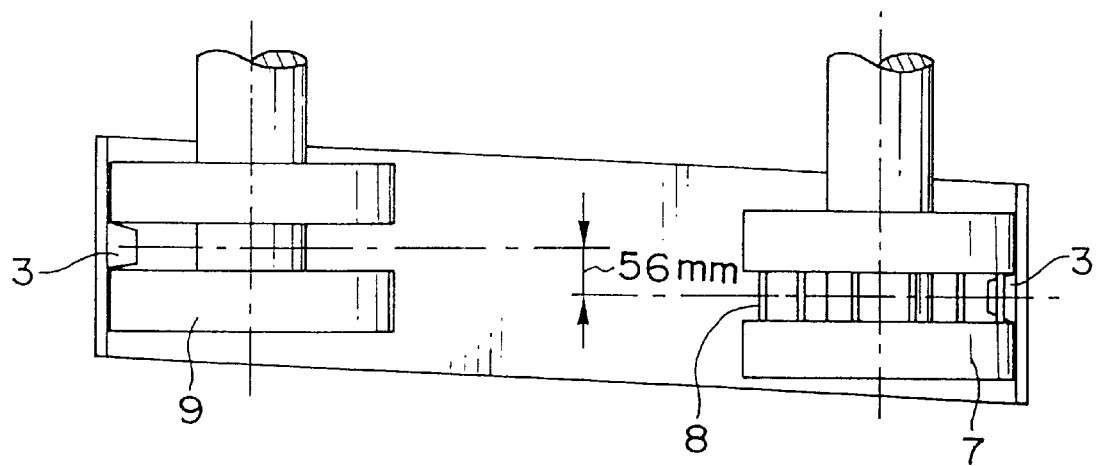
FIG. 6 is a typical view of a bending test machine used to evaluate the performance in the present invention.

The bending test machine shown in FIG. 6 was designed to have an offset of 56 mm to the sprocket 7 and the idler 9 from normal conditions (shown in FIG. 4) with respect to the center path of the rubber track. This devised structure promoted driving torque (running resistance) and abrasion of the side 3$_3$ of the guide lug.

The results of Table 1 show that the guide lug for rubber track prepared by vulcanizing the guide lug composition of the present invention and the rubber track provided with the guide lug exhibited excellent characteristics. The reduced coefficient of friction improves the endurance of the side 3$_3$ of the guide lug significantly. The reduced driving torque also results in an improvement in running resistance. Examples 4–7 and Comparative Example 1:

A UHMW-PE powder and oleylamide were each added to the base rubber composition for Comparative Example 1 in the amounts described in Table 2. Each of these rubber compositions of the examples and comparative example was vulcanized to prepare a rubber. Then a rubber track provided with a guide lug composed of the rubber was produced. The rubber tracks thus obtained were evaluated in the same tests as in Example 1.

TABLE 2

| | Example 4 | Example 5 | Example 6 | Example 7 | Comparative Example 1 |
|---|---|---|---|---|---|
| (Formulation) | | | | | |
| NR | 70 | — | — | — | 70 |
| SBR | 30 | — | — | — | 30 |
| Oleylamide | 0 | — | — | 10 | 0 |
| Macromolecular weight PE powder | 5 | 10 | 20 | 20 | 0 |
| Carbon (HAF) | 60 | — | — | — | 60 |
| Stearic acid | 2 | — | — | — | 2 |
| Zinc oxide | 5 | — | — | — | 5 |
| Aroma oil | 5 | — | — | — | 5 |
| Aging preventive | 2 | — | — | — | 2 |
| Resin | 5 | — | — | — | 5 |
| Sulfur | 2 | — | — | — | 2 |
| Vulcanization accelerator | 1 | — | — | — | 1 |
| (Test evaluation) | | | | | |
| Hd (JIS-A) | 85 | 85 | 87 | 85 | 84 |
| Ts (kgf/cm$^2$) | 195 | 192 | 185 | 170 | 200 |
| Eb (%) | 400 | 350 | 305 | 350 | 410 |
| Coefficient of static friction ($\mu s$) | 1.35 | 1.19 | 1.12 | 0.63 | 2.49 |
| Coefficient of dynamic friction ($\mu d$) | 0.83 | 0.70 | 0.55 | 0.51 | 2.30 |
| Abrasion loss of the side of the guide lug % | 7.7 | 4.6 | 3.9 | 3.1 | 12.3 |
| Driving torque (kgf × m) | 19.4 | 18.0 | 18.0 | 17.0 | 20.0 |

"—" in Table 2 means the same amount as that on the left column.

The results of Table 2 show that the guide lug for the rubber track prepared by curing the guide lug composition of the present invention and the rubber track provided with the guide lug exhibited excellent characteristics. The reduced coefficient of friction improves the endurance of the side $3_3$ of the guide lug significantly. The reduced driving torque also results in an improvement in running resistance.

What is claimed is that:

1. A rubber track comprising a rubber substrate having one or more guide lugs projecting from a surface of the rubber substrate, wherein the one or more guide lugs have a composition comprising a raw rubber material and 5 to 40 parts by weight of a fatty acid amide based on 100 parts by weight of the raw rubber material.

2. A guide lug composition for a rubber track comprising a raw rubber material and 5 to 40 parts by weight of a UHMW-PE powder based on 100 parts by weight of the raw rubber material, wherein the guide lug composition forms guide lugs projecting from a surface of the rubber track.

3. A rubber track comprising a rubber substrate having one or more guide lugs projecting from a surface of the rubber substrate, wherein the one or more guide lugs have a composition comprising a raw rubber material, 5 to 40 parts by weight of a fatty acid amide and 5 to 40 parts by weight of a UHMW-PE powder based on 100 parts by weight of the raw rubber material.

4. A rubber track comprising a rubber substrate having one or more guide lugs projecting from a surface of the rubber substrate, wherein the one or more guide lugs have a composition comprising a raw rubber material and 5 to 40 parts by weight of a UHMW-PE powder based on 100 parts by weight of the raw rubber material.

5. The rubber track according to claim 1, wherein the fatty acid amide is hydroxystearamide, erucylamide, ethylenebisstearamide, ethylenebislaurylamide, stearamide, oleylamide, laurylamide, palmitylamide, methylenebisstearamide, ethylenebisoleylamide or stearyloleylamide.

6. The rubber track according to claim 3, wherein the fatty acid amide is hydroxystearamide, erucylamide, ethylenebisstearamide, ethylenebislaurylamide, stearamide, oleylamide, laurylamide, pahnitylamide, methylenebisstearamide, ethylenebisoleylamide or stearyloleylamide.

7. The rubber track according to claim 4, wherein the UHMW-PE powder has an average particle diameter of from 10 to 50 $\mu$m.

8. The rubber track according to claim 3, wherein the UHMW-PE powder has an average particle diameter of from 10 to 50 $\mu$m.

9. The rubber track according to claim 1, wherein the rubber material is at least one selected from the group consisting of natural rubber, isoprene rubber, styrene-butadiene rubber, acrylonitrile-butadiene rubber, ethylene-propylene rubber, butadiene rubber, butyl rubber, 1,2-polybutadiene and nitrile rubber, and terminal modifications thereof.

10. The rubber track according to claim 4, wherein the rubber material is at least one selected from the group consisting of natural rubber, isoprene rubber, styrene-butadiene rubber, acrylonitrile-butadiene rubber, ethylene-propylene rubber, butadiene rubber, butyl rubber, 1,2-polybutadiene and nitrile rubber, and terminal modifications thereof.

11. The rubber track according to claim 3, wherein the rubber material is at least one selected from the group consisting of natural rubber, isoprene rubber, styrene-butadiene rubber, acrylonitrile-butadiene rubber, ethylene-propylene rubber, butadiene rubber, butyl rubber, 1,2-polybutadiene and nitrile rubber, and terminal modifications thereof.

12. The rubber track according to claim 4, wherein the UHMW-PE powder has an average molecular weight of 1,000,000 or more.

13. The rubber track according to claim 4, wherein the amount of the UHMW-PE powder ranges from 5 to 30 parts by weight.

14. The rubber track according to claim 3, wherein the amount of the UHMW-PE powder ranges from 5 to 30 parts by weight.

15. The rubber track according to claim 4, wherein the amount of the UHMW-PE powder ranges from 5 to 20 parts by weight.

16. The rubber track according to claim 3, wherein the amount of the UHMW-PE powder ranges from 5 to 20 parts by weight.

17. The rubber track according to claim 1, wherein the amount of the fatty acid amide ranges from 5 to 20 parts by weight.

18. The rubber track according to claim 3, wherein the amount of the fatty acid amide ranges from 5 to 20 parts by weight.

19. The rubber track according to claim 1, wherein the amount of the fatty acid amide ranges from 5 to 10 parts by weight.

20. The rubber track according to claim 3, wherein the amount of the fatty acid amide ranges from 5 to 10 parts by weight.

* * * * *